United States Patent [19]
McDowell et al.

[11] 3,709,920
[45] Jan. 9, 1973

[54] METHYLENE-O,O'-BIS(ETHYLACETHYDROXIMATE)

[75] Inventors: Curtis S. McDowell; Michael W. Barnes, both of Edwards Air Force Base, Calif.

[73] Assignee: The United States of America as represented by the Secretary of the Air Force

[22] Filed: Dec. 3, 1969

[21] Appl. No.: 882,758

[52] U.S. Cl.................................260/453 R, 149/109
[51] Int. Cl.........................C07c 85/04, C07c 87/00
[58] Field of Search.........260/566 A, 566 AE, 453 R

[56] References Cited

UNITED STATES PATENTS 2,560,227    7/1951    Kleinschmidt....................260/566 A

*Primary Examiner*—Leland A. Sebastian
*Attorney*—Harry A. Herbert, Jr. and William J. O'Brien

[57] ABSTRACT

A method for synthesizing the novel compound, methylene-O,O'-bis(ethylacethydroximate) by effecting a reflux reaction between (1) a metal salt of ethyl acethydroximate and (2) a disubstituted halomethane.

4 Claims, No Drawings

METHYLENE-O,O'-BIS(ETHYLACETHYDROXIMATE)

BACKGROUND OF THE INVENTION

This invention relates to a new compound and to a method for its preparation. In a more particular manner, this invention concerns itself with the synthesis of methylene-O,O'-bis(ethylacethydroximate) and to a process for effecting that synthesis.

Heretofore, considerable difficulty was encountered by those attempting to synthesize methylene-O,O'bis(ethylacethydroximate).

However, in attempting to overcome these difficulties, it was found that the new compound methylene-O,O'-bis(ethylacethydroximate) could be synthesized by effecting a reflux reaction between (1) an ethylacethydroximate metal salt and (2) a disubstituted halo-methane. The reactants (1) and (2) are dissolved in a suitable solvent and refluxed at temperatures of from 25° to 100°C over a period of time from about one-half to 72 hours.

The new methylene-O,O'-bis(ethylacethydroximate) compound of this invention finds utility as an intermediate or precursor for the synthesis of methylenedioxyamine and its salts by an acid hydrolysis reaction. Methylenedioxyamine and its salts such as methylenedioxyamine diperchlorate are useful as oxidizers for liquid and solid rocket fuels.

SUMMARY OF THE INVENTION

In the present invention, methylene-O,O'-bis(ethylacethydroximate) can be synthesized by a reflux reaction between a metal salt of ethyl acethydroximate and a dihalomethane. The reaction takes place at temperatures ranging from about 25° to 100°C over a period of time of from about one-half to 72 hours.

Accordingly the primary object of this invention is to provide a new compound and a method for its preparation.

Another object of this invention is to provide a method for synthesizing methylene-O,O'-bis(ethylacethydroximate).

Still another object of this invention is to synthesize the new compound methylene-O,O'-bis(ethylacethydroximate).

The above and still further objects and advantages of the present invention will become apparent upon consideration of the following detailed description thereof.

DESCRIPTION OF THE PREFERRED EMBODIMENT

In accordance with this invention, it has been found that the above noted objects can be accomplished by effecting a reflux reaction between (1) and ethyl acethydroximate basic metal salt such as sodium and potassium ethyl acethydroximate and (2) a disubstituted halo-methane such as methylene bromide, methylene iodide and methylene chloride. The reactants are dissolved in a suitable solvent such as acetonitrile, ethanol, dimethylacetamide and dimethylformamide and refluxed over a one-half hour to 72 hour period at temperatures ranging from 25° to 100°C.

The reflux reaction which is believed to take place during the synthesizing of the novel compound methylene-O,O'-bis(ethylacethydroximate) is illustrated by the following:

(I)

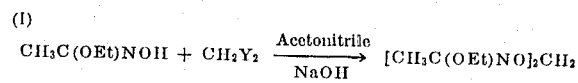

Wherein X represents a member selected from the group consisting of Cl, Br and I.

The product of the above described reflux reaction is recovered by the following procedure. The reaction mixture may be filtered to remove precipitated salts and then distilled or, it may be distilled directly under reduced pressure at temperatures of less than 90°C to remove the solvent. The resulting concentrated oil is taken up in ether, methylene chloride or some other solvent in which the salts are insoluble. It is then washed with water to remove salts and acetamide. The acetamide is a by-product sometimes obtained as a result of decomposition of the bis(ethylacethydroximate). A dilute sodium hydroxide wash for removal of unreacted ethylacethydroximate may be included but is not necessary. After drying and removal of solvent at reduced pressure, the concentrated product, ethylacethydroximate mixture, is then distilled at reduced pressure to give unreacted ethylacethydroximate having a boiling point of 42°C at 4mm and the heretofore unknown methylene-O,O'-bis(ethylacethydroximate) having a boiling point of 64°–67C at 0.5mm. or a boiling point of 88°–92° at 4mm. Yields of greater than 85 percent have been obtained.

In order to further illustrate to those skilled in the art the best mode of operation for the present invention, there is presented the following detailed example. This example, however is presented for purposes of illustration only and is not to be considered as limiting the scope of the invention in any way.

EXAMPLE

To 750 ml of dry acetonitrile was added 15.5g of powdered 98 percent sodium hydroxide (0.380 mole) and 40 g (0.388 mole) of ethylacethydroximate. The mixture was brought to reflux while stirring and 57.1 g (0.213 mole) of methylene iodide was added dropwise. The mixture was refluxed gently with stirring for 42 hours and then was stripped of acetonitrile on a rotary evaporator at reduced pressure and at approximately 80°C. The remaining oil was taken up in methylene chloride (approximately twice the volume of the crude oil) and filtered to remove the byproduct sodium iodide. The methylene chloride was stripped at approximately 40°C under reduced pressure to give 51.2 g of a light brown oil. Distillation of this oil at 64°–67°C and 0.5–0.8 mm gave 39.1 g (92 percent) of a colorless liquid comprising an isomeric mixture of pure (IR) methylene-O,O'-bis(ethylacethydroximate) [$\lambda_{max}^{film}$ 6.11(s), 11.35(s); mmr(CDCl$_3$)$\gamma$ 8.77 and 8.70 two overlapping triplets, (6 CH$_3$ ethyl protons), 8.09 and 8.05 two singlets, (6 CH$_3$ aceto protons), 5.97 and 5.89 two overlapping quartets (4CH$_2$ethyl protons), 4.72 and 4.69 two singlets (2OCH$_2$ protons).]

Analysis calculated for $C_9H_{18}N_2O_4$: C, 49.53; H, 8.31; N, 12.83; Analysis found to be: C, 49.0; H, 8.3; N, 12.8.

What is claimed is:

1. The compound, methylene-O,O'-bis(ethylacethydroximate).

2. A method for synthesizing methylene-O,O'-bis(ethylacethydroximate) which comprise the steps of (1) heating at reflux temperature a solvent mixture of two reactants comprising (a) an ethylacethydroximate metal salt and (b) a disubstituted halo-methane, (2) continuing to heat said mixture for a period of time sufficient to effect a reaction between said two reactants, and (3) separating the reaction product resulting from said reaction.

3. A method in accordance with claim 2 wherein the metal component of the first reactant is selected from the group consisting of sodium and potassium.

4. A method in accordance with claim 2 wherein the halogen component of said second reactant is selected from the group consisting of bromine, iodine and chlorine.

* * * * *